(12) United States Patent
Yin et al.

(10) Patent No.: US 6,842,293 B1
(45) Date of Patent: Jan. 11, 2005

(54) BEAM EXPANDER

(76) Inventors: Yusong Yin, 390 Central Ave., Bohemia, NY (US) 11716; Xiaojie Zhao, 390 Central Ave., Bohemia, NY (US) 11716; Jing Zhao, 390 Central Ave., Bohemia, NY (US) 11716

( * ) Notice: Subject to any disclaimer, the term of this patent is extended or adjusted under 35 U.S.C. 154(b) by 256 days.

(21) Appl. No.: 10/122,060

(22) Filed: Apr. 13, 2002

(51) Int. Cl.[7] .............................................. G02B 27/30
(52) U.S. Cl. ..................... 359/641; 359/726; 359/729
(58) Field of Search ............................. 359/627, 637, 359/641, 726–731, 850, 857–859, 871–877, 365–366, 399, 728

(56) References Cited

U.S. PATENT DOCUMENTS

| | | | |
|---|---|---|---|
| 5,172,277 A | * 12/1992 | Wahl et al. | 359/820 |
| 6,356,576 B1 | * 3/2002 | Smith | 372/102 |
| 6,407,363 B2 | * 6/2002 | Dunsky et al. | 219/121.71 |
| 2002/0054434 A1 | * 5/2002 | Florczak et al. | 359/619 |
| 2002/0164069 A1 | * 11/2002 | Nagano et al. | 382/154 |

* cited by examiner

Primary Examiner—Jordan M. Schwartz
Assistant Examiner—Jessica Stultz
(74) Attorney, Agent, or Firm—James A. Quinton

(57) ABSTRACT

A laser beam includes a concave or convex mirror which is reflective for wavelength of the high intensity beam. The reflective mirror is located along a preselected path of a high intensity laser beam so that the high intensity laser beam intersects the mirror at a first position. A beam collimator is located in the path of the high intensity beam reflected by the concave or convex mirror. The concave or convex mirror is movably mounted desirably rotatably mounted in the path of the high intensity beam. Desirably the mirror is rotated about a preselected axis. Desirably, the axis is selected so that when the mirror is rotated to a new position, the high intensity beam will be reflected along the same path to the collimator as it was prior to any rotation.

26 Claims, 4 Drawing Sheets

BEAM EXPANDER

BACKGROUND OF THE INVENTION

1. Field of the Invention

The subject invention relates to a high intensity laser beam delivery system, a beam expander for use in a high intensity laser beam delivery system and a method for expanding the beam diameter of a high intensity beam.

2. Background and Related Art

High intensity laser beams are now in use in the art. Such beams include UV beam such as third and fourth harmonic of Nd:YAG, Nd:YVO4 and Nd:YLF UV beams. See U.S. Pat. Nos. 5,898,717 (YIN) and 6,061,370 (YIN). High intensity beams particular UV beams can damage the coatings, lenses and mirrors used to direct and focus the high intensity beam to a desired location or work surface.

Beam expanders have been used in the art for a variety of purposes. For example, beam expanders have been used to increase the beam diameter of a high intensity beam to reduce damage to system components. They have also been used to expand the beam so it can then be focused to smaller spot size. However, such prior art beam expanders have been susceptible to damage by the high intensity beam and have resulted in diminished longevity of the high intensity laser beam delivery system. There is a need for high intensity laser beam delivery systems, which have a long life and which can deliver an expanded high intensity beam.

SUMMARY OF THE INVENTION

According to the invention, a high intensity laser beam delivery system is provided. In another aspect of the invention, a beam expander for use in high intensity laser beam delivery apparatus is provided and a method of expanding the beam size of a high intensity beam is provided. In the use of high intensity beams, especially UV beams, the high intensity beams can damage optics that are used to direct and focus the high intensity beam on the work surface. Thus, the high intensity beams can damage the mirrors, coatings and lenses used in optical systems. As a result, it is important to reduce the intensity of the beam prior to its incidenting on the optics.

According to the invention, a laser beam delivery system for delivering a high intensity laser beam to a preselected location is provided. The laser beam delivery system includes a laser beam expander for a high intensity laser beam. The laser beam expander includes a concave or convex mirror which is highly reflective for the wavelength of the high intensity beam. The highly reflective concave or convex mirror is located along a preselected path of a high intensity laser beam so that the high intensity laser beam intersects the concave or convex mirror at a first position. A beam collimator is located in the path of the high intensity beam reflected by the concave or convex mirror. The concave or convex mirror is movably mounted desirably rotatably mounted in the path of the high intensity beam. Desirably the mirror is rotated about a preselected axis. Desirably, the axis is selected so that when the mirror is rotated to a new position, the high intensity beam will be reflected along the same path to the collimator as it was prior to any rotation.

In operation, a high intensity laser beam is directed along a preselected path that intersects the high reflecting concave or convex mirror. The beam incidents on the concave or convex mirror and is reflected as an expanding beam with a resulting expansion of the size of the beam. The beam is directed to a beam collimator e.g. a concave mirror or a lens. The beam is collimated at a preselected size and then directed to delivering optics with reduced intensity.

After a period of time, the high intensity beam will damage the coating of high reflecting mirror. At such time, the mirror will be moved preferably rotated about a preselected axis to bring a different position on the mirror in the path of the high intensity beam. Desirably, the highly reflecting mirror will be rotated about an axis that will not change the path of the reflected beam. The rotation results in a new position on the mirror being placed in the path of the high intensity beam. Preferably, the beam will then be reflected along the same path as it was prior to rotation of the mirror. The mirror can be rotated numerous times around the circumference of the mirror if the mirror curvature is spherical until there are no points around the circumference of the mirror that have not been damaged. If the mirror is convex cylindrical shape, the mirror can be moved along cylindrical axis or rotated around the circumference numerous times. Thus, the longevity of the beam expander has been substantially increased.

The preferred embodiment of the present invention is illustrated in the drawings and examples. However, it should be expressly, understood that the present invention should not be limited solely to the illustrative embodiment.

DETAILED DESCRIPTION OF THE INVENTION

Figure 1:
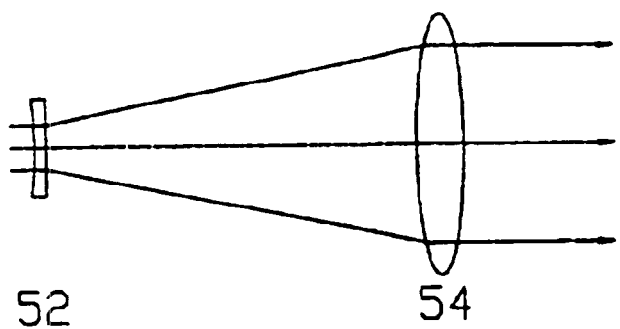
FIG. 1 and FIG. 2 are diagrammatic views of a prior art beam expanders.

According to the invention, a high intensity laser beam delivery system is provided. In another aspect of the invention, a beam expander for use in high intensity laser beam delivery apparatus is provided and a method of expanding the beam size of a high intensity beam is provided. In the use of high intensity beams, especially UV beams, the high intensity beams can damage optics that are used to direct and focus the high intensity beam on the work surface. As a result, it is important to reduce the intensity of the beam prior to its incidenting on system optics and thus prolong the optics lifetime.

According to the invention, a laser beam delivery system for delivering a high intensity laser beam to a preselected location is provided. The laser beam delivery system includes a laser beam expander for a high intensity laser beam. The high intensity laser beam can be a third or fourth harmonic of Nd:YAG, Nd:YLF or Nd:YVO4 UV beam. The laser beam expander includes a concave or convex mirror which is highly reflective for the wavelength of the high intensity beam. The highly reflective concave or convex mirror is located along a preselected path of a high intensity laser beam so that the high intensity laser beam intersects the concave or convex mirror at a first position. The concave or convex mirror is movably mounted preferably rotatably mounted in the path of the high intensity beam. Optionally, the concave or convex mirror can be mounted to a translation table which can be computer controlled to move the mirror to a number of preselected positions in the x and y planes. Optionally, the concave or convex mirror can be rotatably mounted to a translation table. Desirably, the mirror's rotation is motorized and desirably computer controlled for movement about one or more preselected axises. Optionally, the mirror can be moved by hand about one or more predetermined axes. Desirably, the concave or convex mirror is rotatably mounted in the path of the high intensity beam. Desirably, a rotator, preferably motorized, is operatively connected to the high reflecting mirror so that the mirror can be rotated about a preselected axis. Desirably, the rotation axis is selected so that the beam will be reflected along the same path to the collimator when the concave or convex mirror is rotated to a different position.

Desirably, the preselected rotation axis passes through the origin of curvature of the concave or convex reflecting mirror. The origin of curvature of a concave or convex mirror as used herein is dependent on whether the mirror is spherical or cylindrical. The origin of curvature of a spherical mirror is the origin of the sphere that would be formed if it were extended to form a sphere at constant R where R is the radius. The origin of curvature when the mirror is cylindrical is the cylindrical axis of the mirror.

When the axis of rotation passes through the origin of curvature, the high intensity beam incidents on the surface of the mirror at the same point in space and at the same incident angle so that when the mirror is rotated, the beam path of the high intensity beam is unchanged. When the mirror is spherical, preferably, the axis of rotation also passes through the approximate geometrical center of the surface of the mirror. Such a location maximizes the number of positions on the mirror that can be moved to intersect the high intensity beam. Optionally, a second axis of rotation is provided. Preferably, the second axis of rotation is also through the origin of curvature. Desirably, the second axis of rotation is orthogonal to the first axis of rotation.

Other rotation axes are possible, however, they would result in having to realign the system since the beam paths would be changed and the location of the output beam would be different. This would generally not be desirable as it would be difficult to use in a fixed processing system.

A beam collimator is located in the path of the high intensity beam reflected by the concave or convex mirror. Desirably, the beam collimator is a lens or a concave mirror to collimate the high intensity beam reflected by the concave or convex reflecting mirror. In the case of a concave mirror, the mirror is desirably rotatably mounted in the path of the expanded high intensity beam so that when a point on the collimator concave mirror is damaged, a new point on the concave mirror can be rotated into place. Optionally, the collimator concave mirror has an axis of rotation that passes through the origin of the curvature of the concave mirror. Preferably, the axis of rotation is through the geometrical center of the surface of the mirror. Optionally, a second axis of rotation could also be provided. However, in practice, one axis of rotation is most desirable. Since the high intensity beam has already been expanded prior to incidenting on the concave mirror, any damage to the collimating concave mirror occurs less quickly than to the reflecting mirror. As a result, the collimator, concave mirror will be damaged more slowly than will the highly reflecting mirror and as a result a new position for contact with the high intensity beam will be required less frequently than on the reflecting mirror.

In operation, a high intensity laser beam is directed along a preselected path that intersects the high reflecting concave or convex mirror. The beam incidents on the concave or convex reflecting mirror and is reflected as an expanding beam with a resulting expansion of the size of the beam. The beam is directed to a beam collimator e.g. a concave mirror or a lens. The beam is collimated at a preselected size and shape and then directed to other optics for delivering the high intensity beam. After a period of time, the high intensity beam will cause the coating of the highly reflecting mirror to deteriorate or be damaged. At such time, the mirror will be rotated about a preselected axis to bring a different position on the mirror in the path of the high intensity beam. Desirably, highly reflecting mirror will be rotated about an axis that will not change the path of the reflected beam. The rotation results in a new position on the mirror being placed in the path of the high intensity beam. Preferably, the beam will then be reflected along the same path as it was prior to rotation of the mirror. The mirror can be rotated numerous times around the circumference of the mirror until there are no points around circumference of the mirror that have not been damaged. Thereafter the mirror can be rotated about a second axis of rotation to expose further undamaged positions on the mirror to the high intensity beam. Optionally, the beam collimator can also be rotated if it becomes damaged.

Figure 2:
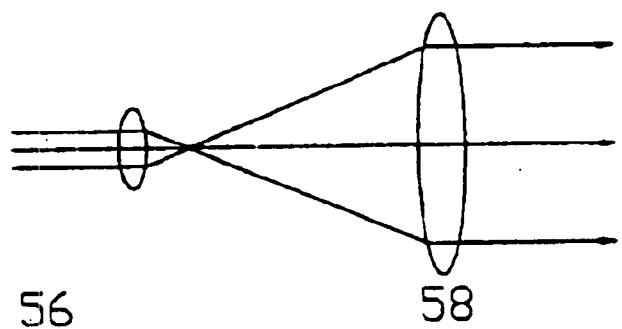

Referring now to the Figures, FIG. 1 and FIG. 2 show prior art beam expanders. FIG. 1 shows a high intensity beam delivered to a negative lens 52 where the beam is expanded and directed to a lens 54 where it is collimated. FIG. 2 shows a similar prior art device where a high intensity beam is delivered to lens 56 where the beam is expanded and delivered to lens 58 where it is collimated. In both such devices, lenses 52 and 56 are subject to damage due to their contact with the high intensity beam.

Figure 3A:
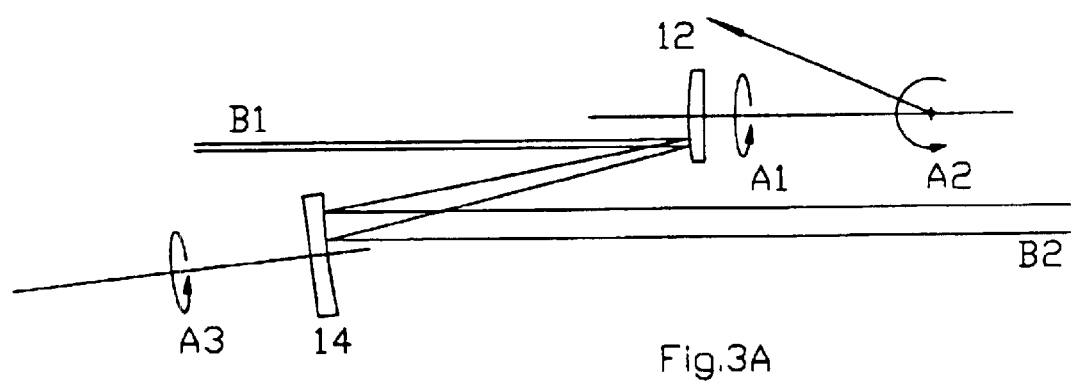
FIG. 3A is a diagrammatic view of the beam expander according to the invention.

Referring to FIG. 3A, a beam expander for use in a high intensity laser beam delivery apparatus is provided. A high intensity beam B1 is directed to a concave or convex mirror, desirably, a convex spherical mirror 12 which has been movably mounted preferably rotatably mounted in the path of high intensity beam B1. The mirror 12 has at least one axis of rotation, preferably two axes A1 and A2 of rotation. Desirably, the axes of rotation pass through the origin of curvature of the mirror. Since mirror 12 is a spherical mirror, the axis of rotation A1 is preferably through the origin of sphere curvature of mirror 12 as well as its geo-center.

The origin of curvature of the spherical mirror 12 is the origin of the sphere that would be formed if it were extended to form a sphere at constant R where R is the radius. Thus, when the axis of rotation is through X, the origin of sphere curvature, the beam B1 intersects mirror 12 at the same point in space with the same incident angle to the surface of mirror 12. Desirably, mirror 12 has two axes of rotation A1 and A2. The axis A1 passes through the origin of sphere curvature of the mirror 12 and preferably pass through the approximate geometrical center of the mirror to maximize available positions. Optionally, a second axis of rotation A2 is provided. Axis A2 desirably also passes through the origin of sphere curvature and is preferably orthogonal to axis A1.

A beam collimator, preferably a concave mirror 14 is mounted in optical communication with convex mirror 12 to receive reflected high intensity beam B1 from convex mirror 12 and to collimate such reflected beam. Optionally, concave mirror 14 is rotatably mounted about axis A3 through the origin of the sphere curvature of the concave mirror and preferably through the geometrical center of the concave mirror. The collimated beam B2 is then directed to a work station, to other lenses and/or focusing apparatus for ultimate use, for example for focusing on a work piece.

Figure 4A:
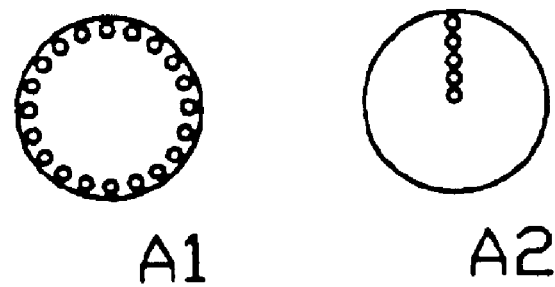
FIG. 4A is a diagrammatic view of mirror 12 of FIG. 3A according to the invention.

In operation, a high intensity beam is directed to convex mirror 12 where it is reflected and expanded. The expanded beam then is directed to beam collimator, preferably concave mirror 14 which collimates the expanded beam and directs to a delivery optics or a location for ultimate use e.g. focusing on a work piece or the like. When convex mirror 12 becomes damaged due to contact with the high intensity beam B1, the mirror is rotated about axis A1 to bring a different position of the mirror in contact with the high intensity beam. This rotation is repeated as each position around the circumference of the mirror becomes damaged without changing the path of the high intensity beam. As best seen in FIG. 4A, when the mirror has been rotated through substantially all the available positions in the initial circumfrential range, optionally the mirror can be rotated around axis A2 which is preferably orthogonal to axis A1. As a result, a new position on the mirror is provided for contact with the high intensity beam. When this new position is damaged, desirably the mirror is rotated again around axis A1 until all the positions circumfrentially around the mirror have been damaged at which time a further rotation around axis A2 is performed to expose a further location on the mirror to the high intensity beam without changing the path of the beam.

Optionally, when collimator concave mirror 14 becomes damaged from contact with the high intensity beam, it can be rotated about axis A3 to bring a different position on the mirror in contact with the beam without changing the of the beam.

Figure 3B:
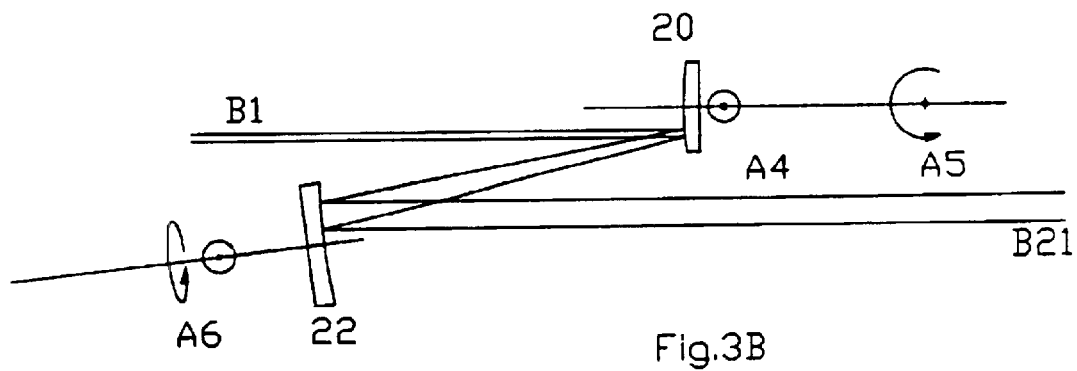
FIG. 3B is a diagrammatic view of an alternative embodiment of the beam expander according to the invention.
Figure 4B:
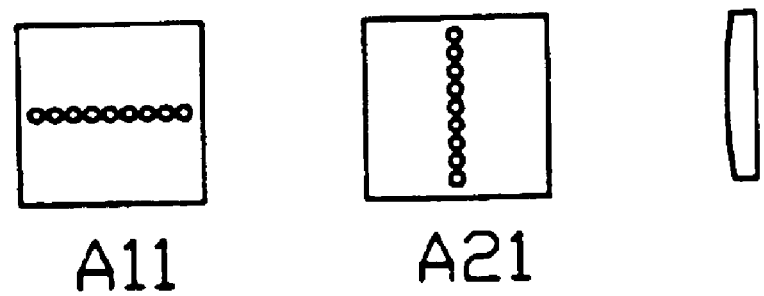
FIG. 4B is a diagrammatic view of mirror 20 of FIG. 3B according to the invention.

Referring now to FIG. 3B and FIG. 4B, an alternative embodiment of the beam expander for use in a high intensity laser beam delivery apparatus is provided. As shown in FIG. 3B, a high intensity beam B1 is directed to a convex cylindrical mirror 20 which has been mounted in the path, preferably moveable mounted in the path of high intensity beam B1. Mirror 20 desirably has one (1) axis of rotation at A5, and preferably one(1) translation axis A4 which is translating along axis A5. Desirably, the axis of rotation A5 pass through the origin of curvature of the mirror. In this instance, since it is a cylindrical mirror, the axis of rotation A5 coincides with the cylindrical axis of the cylindrical mirror 20. The translation axis A4 is parallel to the rotation axis A5. According to the invention, the mirror 20 is movable along the cylindrical axis A5 to provide a new location on the mirror 20 for the beam B1 to intersect the mirror 20 at the same point in space with the same incident and the angle to the mirror 20 so that the resulting reflected beam propagates along the same path despite the translation of the mirror. Movement along the translation axis A4 provides further points on the mirror 20 for incidenting with the beam B1. Preferably movement about both the translation axis A4 and the rotation axis A5 is provided. Optionally movement about only one of the axes is provided. Similar to the embodiment of 3A, as seen in 3B, a beam collimator, preferably a concave mirror 22 is mounted in optical communication with convex mirror 20 to receive reflected high intensity beam B1 from convex mirror 20 and to collimate such reflected beam. Optionally, concave mirror 22 is rotatably mounted about axis A6 through the origin of the sphere curvature of the concave mirror and preferably through the geometrical center of the concave mirror. The collimated beam B21 is then directed to a work station, to other lenses and/or focusing apparatus for ultimate use, for example for focusing on a work piece.

As best seen in FIG. 4B, as the mirror is moved, a plurality of different points along the mirror are damaged by the beam, but a new point on the mirror can be provided for reflecting the beam. All of FIG. 4B shows the plurality of damaged points along the mirror as it is moved along the cylindrical axis A5. A21 of FIG. 4B shows the plurality of damaged points that occur along the mirror as the mirror is translated along axis A4. The resulting reflected beam follows the original beam path despite the translation. As a result there will be no need to realign any of the processing equipment.

EXAMPLE

A beam expander as shown in FIG. 3A was constructed. B1 UV beam is 10 watts UV 355 nm laser beam with beam diameter of about 1 mm. The coating of the mirror 12 coated from Spectrum Thim Film, Bohemia, N.Y., lasted about 150 hours before it is substantially deteriorated or damaged. After 150 hours, the mirror 12 was rotated to a new position where it lasted another about 150 hours. There are at least 200 available points for the mirror 12 to rotate, approximate lifetime for the mirror 12 is about 30,000 hours as compared to prior art of about 150 hours.

Figure 5:
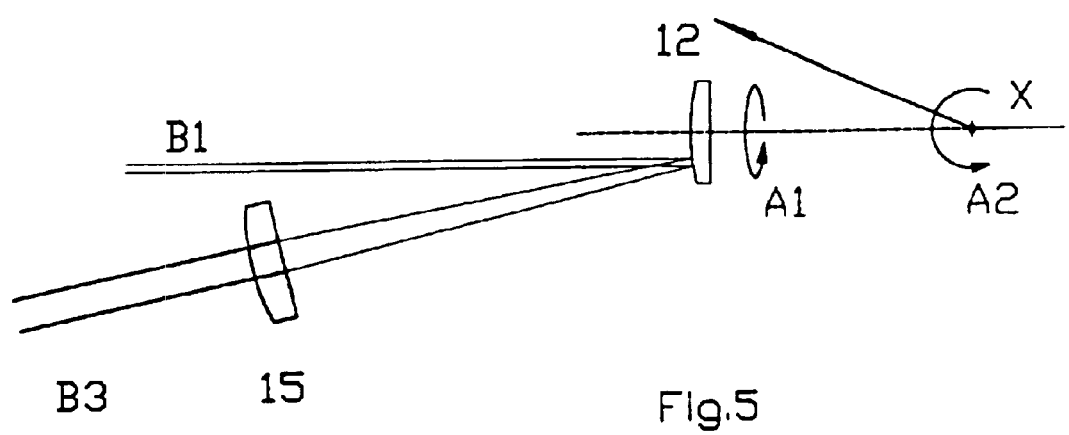
FIG. 5 is a diagrammatic view of an alternative embodiment of the invention.

Referring to FIG. 5, a beam expander for use in a high intensity laser beam delivery apparatus is provided. As in FIG. 3, a high intensity beam B1 is directed to a concave or convex mirror 12 which has been rotatably mounted in the path of high intensity beam B1. The mirror 12 has at least one axis of rotation, preferably two axes A1 and A2 of rotation. Desirably, the axes of rotation pass through the origin of curvature of the mirror.

Thus, when the axis of rotation is through X, the origin of sphere curvature, the beam B1 intersects mirror 12 at the same point in space with the same incident angle to the surface of mirror 12. Desirably, mirror 12 has two axises of rotation A1 and A2. The axis A1 passes through the origin of sphere curvature of the mirror 12 and preferably pass through the approximate geometrical center of the mirror to maximize available positions. Optionally, second axis of rotation A2 is provided. Axis A2 desirably also passes through the origin of sphere curvature and is preferably orthogonal to axis A1.

A beam collimator, preferably a lens 15 is mounted in optical communication with convex mirror 12 to receive reflected high intensity beam B1 from convex mirror 12 and to collimate such reflected beam. The collimated beam B3 is then directed to a work station, to other lenses and/or focusing apparatus for ultimate use, for example for focusing on a work piece. The movement of mirror 12 when it becomes damaged has been described in connection with FIG. 3.

The foregoing is considered as illustrative only to the principles of the invention. Further, since numerous changes and modification will occur to those skilled in the art, it is not desired to limit the invention to the exact construction and operation shown and described above, and accordingly all suitable modifications and equivalents may be resorted to, falling within the scope of the invention.

What is claimed is:

1. A laser beam expander for a high intensity laser beam comprising:

a) a reflecting concave or convex mirror for said high intensity laser beam to reflect said high intensity laser beam and expand the size of said beam; said high intensity laser beam having a preselected path intersecting said reflecting mirror at a first position; said reflecting mirror reflecting said high intensity laser beam on a preselected reflection path;

b) a beam collimator in optical communication with said high intensity laser beam reflected by said reflecting mirror to collimate said reflected beam;

c) said reflecting mirror moveably mounted in the path of said high intensity laser beam so that said mirror can be moved to bring different positions on said mirror in the preselected path of said high intensity laser beam when a position on said mirror is damaged without changing said preselected reflection path.

2. A laser beam expander according to claim 1 wherein said reflecting mirror is rotatably mounted about a first preselected axis so that said mirror can be rotated to bring said different positions on said mirror in said preselected path of said high intensity laser beam when a position on said mirror is damaged.

3. A laser beam expander according to claim 2 wherein said first preselected axis passes through the origin of curvature of said reflecting mirror so that when said mirror is rotated to said different positions said reflecting mirror intersects said high intensity beam at the same point in space and with the same incident angle.

4. A laser beam expander according to claim 3 wherein said reflecting mirror is rotatably mounted about a second axis of rotation to rotate said mirror in a different direction than said first axis of rotation.

5. A laser beam expander according to claim 4 wherein said second axis of rotation passes through the origin of curvature and is orthogonal to said first axis of rotation.

6. A laser beam expander according to claim 4 wherein said reflecting mirror of part a) is a spherical convex mirror.

7. A laser beam expander according to claim 3 wherein said reflecting mirror of part a) is a cylindrical convex mirror.

8. A laser beam expander according to claim 6 wherein said first preselected axis passes through the geometrical center of the surface of said reflecting mirror.

9. A laser beam expander according to claim 5 wherein said beam collimator is a collimating reflective concave mirror.

10. A laser beam expander according to claim 9 wherein said beam collimating concave mirror is rotatably mounted about a collimator axis of rotation so that said collimating concave mirror can be rotated to bring one or more different positions on said mirror in optical communication with said high intensity laser beam.

11. A laser beam expander according to claim 10 wherein said collimator axis passes through the origin of curvature of said collimating concave mirror.

12. A laser beam expander according to claim 5 wherein said collimator is a lens.

13. A method for expanding a high intensity laser beam comprising:

a) directing a high intensity beam on a first preselected path to incident on a reflecting concave or convex mirror at a preselected first, position;

b) reflecting said beam from said reflecting mirror on a second preselected path so that said reflected beam has an expanding beam path to expand the size of said beam;

c) collimating said expanded beam at a predetermined beam size and directing said collimated beam on a third preselected path;

d) moving said reflecting concave or convex mirror so that said high intensity beam incidents on a second predetermined position when said first position has been damaged by said high intensity beam without changing said second predetermined path;

e) further moving said reflecting concave or convex mirror to a further predetermined position when a previous position has been damaged by said high intensity beam without changing said second predetermined path.

14. A method of expanding high intensity laser beam according to claim 13 wherein said moving in paragraph d and e is rotating said reflecting concave or convex mirror about a first preselected axis.

15. A method of expanding high intensity laser beam according to claim 14 wherein said first preselected axis passes through the origin of curvature of said reflecting mirror.

16. A method of expanding high intensity laser beam according to claim 15 further comprising rotating said high reflecting mirror about a second axis of rotation to rotate said mirror in a different direction than said first axis of rotation.

17. A method of expanding high intensity laser beam according to claim 16 wherein said second axis of rotation passes through the origin of curvature of said reflecting mirror and is orthogonal to said first axis of rotation.

18. A method of expanding high intensity laser beam according to claim 14 wherein said high reflecting mirror is a spherical convex mirror.

19. A method of expanding high intensity laser beam according to claim 14 wherein said reflecting mirror is a cylindrical convex mirror.

20. A method of expanding high intensity laser beam according to claim 18 wherein said first preselected axis passes through the geometrical center of the surface of said reflecting mirror.

21. A high intensity laser beam delivery system comprising:

a) a UV laser beam generator for generating a UV beam;

b) a reflecting concave or convex mirror highly reflective for said UV beam to reflect said UV beam and expand the size of said beam; said UV beam having a preselected path intersecting said mirror at a first position; said reflecting mirror reflecting said high intensity beam on a reflection path:

c) a collimating concave mirror or lens in optical communication with said UV beam reflected by said reflecting mirror to collimate said reflected beam;

d) said reflecting mirror rotatably mounted in the path of said high intensity laser beam about a first preselected axis; said first preselected axis passing through the origin of curvature of said reflecting mirror so that when said mirror is rotated to said different positions said reflecting mirror intersects said high intensity beam at the same point in space and with the same incident angle so that said mirror can be rotated to bring different positions on said mirror in the preselected path of said high intensity laser beam when a position on said mirror is damaged without changing said reflection path.

22. A high intensity laser beam delivery system according to claim 21 wherein said reflecting mirror of part b) is a spherical convex mirror.

23. A high intensity laser beam delivery system according to claim 21 wherein said reflecting mirror of part b) is a cylindrical convex mirror.

24. A high intensity laser beam delivery system according to claim 22 wherein said first preselected axis passes through the geometrical center of the surface of said reflecting mirror.

25. A high intensity laser beam delivery system according to claim 21 wherein said reflecting mirror is rotatably mounted about a second axis of rotation to rotate said mirror in a different direction than said first axis of rotation.

26. A high intensity laser beam delivery system according to claim 25 wherein said second axis of rotation passes through the origin of curvature and is orthogonal to said first axis of rotation.

* * * * *